(12) United States Patent
Hsu

(10) Patent No.: US 7,673,936 B2
(45) Date of Patent: Mar. 9, 2010

(54) ADJUSTABLE BICYCLE SEAT ASSEMBLY

(76) Inventor: Jung Yu Hsu, No. 72. Gung Ming South 1st Rd., An Nan Dist., Tainan City 709 (TW)

( * ) Notice: Subject to any disclaimer, the term of this patent is extended or adjusted under 35 U.S.C. 154(b) by 0 days.

(21) Appl. No.: 11/976,482

(22) Filed: Oct. 25, 2007

(65) Prior Publication Data

US 2009/0108642 A1    Apr. 30, 2009

(51) Int. Cl.
*B62J 1/00* (2006.01)
*A47C 1/00* (2006.01)

(52) U.S. Cl. .................................. 297/215.13; 297/339
(58) Field of Classification Search ............ 297/344.19, 297/338, 339, 344.18, 195.1, 215.13; 248/161; 280/287
See application file for complete search history.

(56) References Cited

U.S. PATENT DOCUMENTS 3,547,394 A * 12/1970 Wehner ....................... 248/412
4,485,996 A * 12/1984 Beukema et al. ............ 248/407
4,807,856 A *  2/1989 Teckenbrock ............... 267/132

* cited by examiner

*Primary Examiner*—Milton Nelson, Jr.
(74) *Attorney, Agent, or Firm*—Rosenberg, Klein & Lee

(57) ABSTRACT

An adjustable bicycle seat assembly includes an adjusting unit which includes a top end member connected to the seat post and an adjusting tube is connected to a lower end of the top end member. An inner space is defined in the adjusting tube and an outer space is defined between the adjusting tube and the seat post. A path is defined between the adjusting tube and the top end member so as to communicate with the inner space and the outer space. An axle is movably received in the path and removably seals the path. An anti-rotation device is located between the seat post and the seat tube so as to prevent the seat post from rotating relative to the seat tube.

11 Claims, 7 Drawing Sheets

ADJUSTABLE BICYCLE SEAT ASSEMBLY

FIELD OF THE INVENTION

The present invention relates to an adjustable bicycle seat assembly by using hydraulic oil and air to adjust the height of the seat and the seat post is not rotatable relative to the seat tube.

BACKGROUND OF THE INVENTION

A bicycle rider sits on the seat which is connected to the seat tube of the bicycle frame and vibration transferred from the ground is transferred to the rider via the tires, the wheels, the seat tube and the seat post. However to reduce the vibration transferred to the rider is one of the main concerns to the bicycle manufacturers. Besides, the height of the seat is related to safety and comfortable riding to the riders of different heights. Therefore, an adjustable bicycle seat assembly is developed to meet the requirements and disclosed in U.S. Pat. No. 7,083,180 which discloses a seat post adjustably inserted into the seat tube of the bicycle frame and a separation member is located between the seat post and the seat tube. An opening is defined in the separation member and an axle extends through the opening and the other end of the axle is connected to a movable member in the seat tube. The axle is moveable between the first position and the second position, and the seat tube and the seat post are moved relative to each other so as to control the travel path of the fluid which is filled in the second position and air is filled in the first position. The fluid flows when the opening is opened so as to compress the air to adjust the relative position of the seat post and the seat tube. However, the seat tube and the seat post are both circular tubes which rotate relative each other. The seat rotates especially when vibration is transferred to the rider and the rider cannot concentrate to operate the handlebar of the bicycle.

The present invention intends to provide an adjustable bicycle seat assembly wherein the seat post is adjusted relative to the seat tube of the bicycle frame and the seat post is not rotated relative to the seat tube.

SUMMARY OF THE INVENTION

The present invention relates to an adjustable bicycle seat assembly which comprises a seat tube with a first end of a seat post inserted therein and a seat is connected to a second end of the seat post. An adjusting unit includes a top end member which is connected to the second end of the seat post and an adjusting tube is connected to a lower end of the top end member. An inner space is defined in the adjusting tube and an outer space is defined between the adjusting tube and the seat post. A path is defined between the adjusting tube and the top end member so as to communicate with the inner space and the outer space. An axle is movably received in the path and removably seals the path.

The primary object of the present invention is to provide a bicycle seat assembly wherein the height of the seat can be easily adjusted by operating a lever by moving the hydraulic oil via a path in the assembly.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
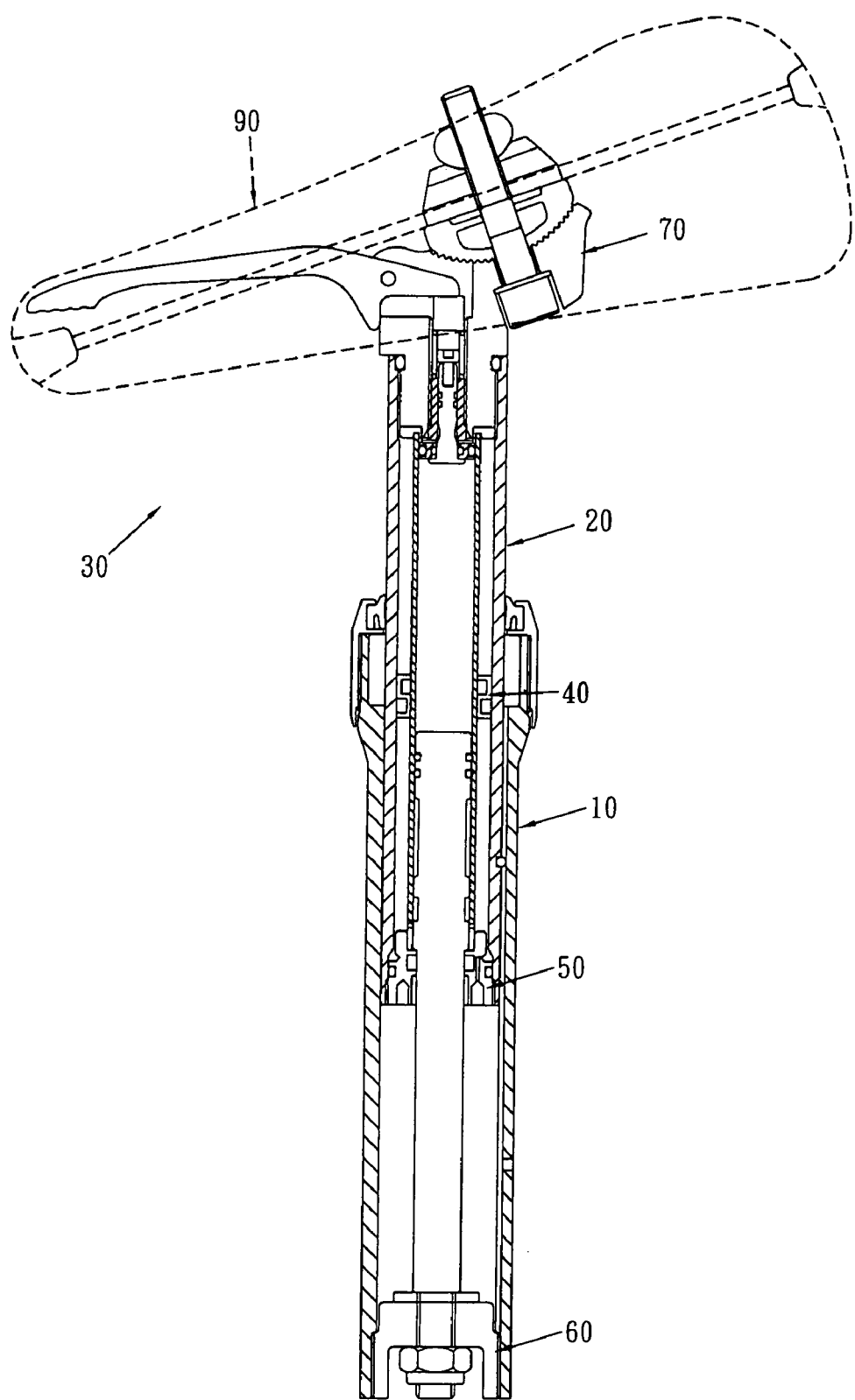
FIG. 1 is a cross sectional view to show the adjustable bicycle seat assembly of the present invention with a seat.

Referring to FIG. 1, the adjustable bicycle seat assembly of the present invention comprises a seat tube 10 in which a first end of a seat post 20 is inserted and a seat 90 is connected to a second end of the seat post 20.

An adjusting unit 30 includes a top end member 31 which is connected to the second end of the seat post 20 and an adjusting tube 32 is connected to a lower end of the top end member 31. An inner space 331 is defined in the adjusting tube 32 and an outer space 332 is defined between the adjusting tube 32 and the seat post 20. At least one gap 34 is defined in the top end member 31 and communicates between the inner and outer spaces 331, 332.

A first valve 35 is located in an inner periphery of the second end of the seat post 20 and a passage 351 is defined centrally therethrough so as to form a part of a path 39 which will be described after. A sleeve 361 is located in the top end member 31 and an axle 362 movably extends through the sleeve 361. A gap is defined between a top of the first valve 35 and a lower end of the sleeve 361, the gap forms a part of the path 39. The first valve 35 can also be integrally connected with the sleeve 361 and a through hole 352 is defined through a conjunction portion of the first valve 35 and the sleeve 361. The through hole 352 forms a part of the path 39. The axle 362 movably extends through the passage 351 so as to removably seal an opening defined in the lower end of the passage 351.

A lever 38 is pivotably connected to the second end of seat post 20 and a contact member 37 is connected between lever 38 and the axle 362, contact member 37 is movable with the lever 38, so that when the lever 38 is pivoted upward, the contact member 37 applies a downward force to move the axle 362.

A path 39 is defined between the axle 362, the first valve 35, the contact member 37, the adjusting tube 32 and the at least gap 34, the hydraulic oil may flow through the passage 351 and the gaps of the contact member 37 and the first valve 35, and the at least one gap 34 to communicate between the inner and outer spaces 331, 332.

A separation member 40 is located between the adjusting tube 32 and the seat post 20 so as to define an oil room 41 and an air room 42. A second valve 50 is located in the first end of the seat post 20 and the adjusting tube 32 is connected with the second valve 50. The second valve 50 defines a first chamber 51 in the seat post 20 and a second chamber 52 in the seat tube 10. The second valve 50 controls the communication between the first and second chambers 51, 52.

A guide rod 61 has one end inserted into the adjusting tube 32 and a seal member 60 is connected to the other end of the guide rod 61. The adjusting tube 32 moves relative to the seat post 10 along the guide rod 61. A clamp device 70 is connected to the top end member 31 and the seat 90 is connected to the clamp device 70 by a clamp member which is integrally connected with the adjusting tube 32.

Figure 2:
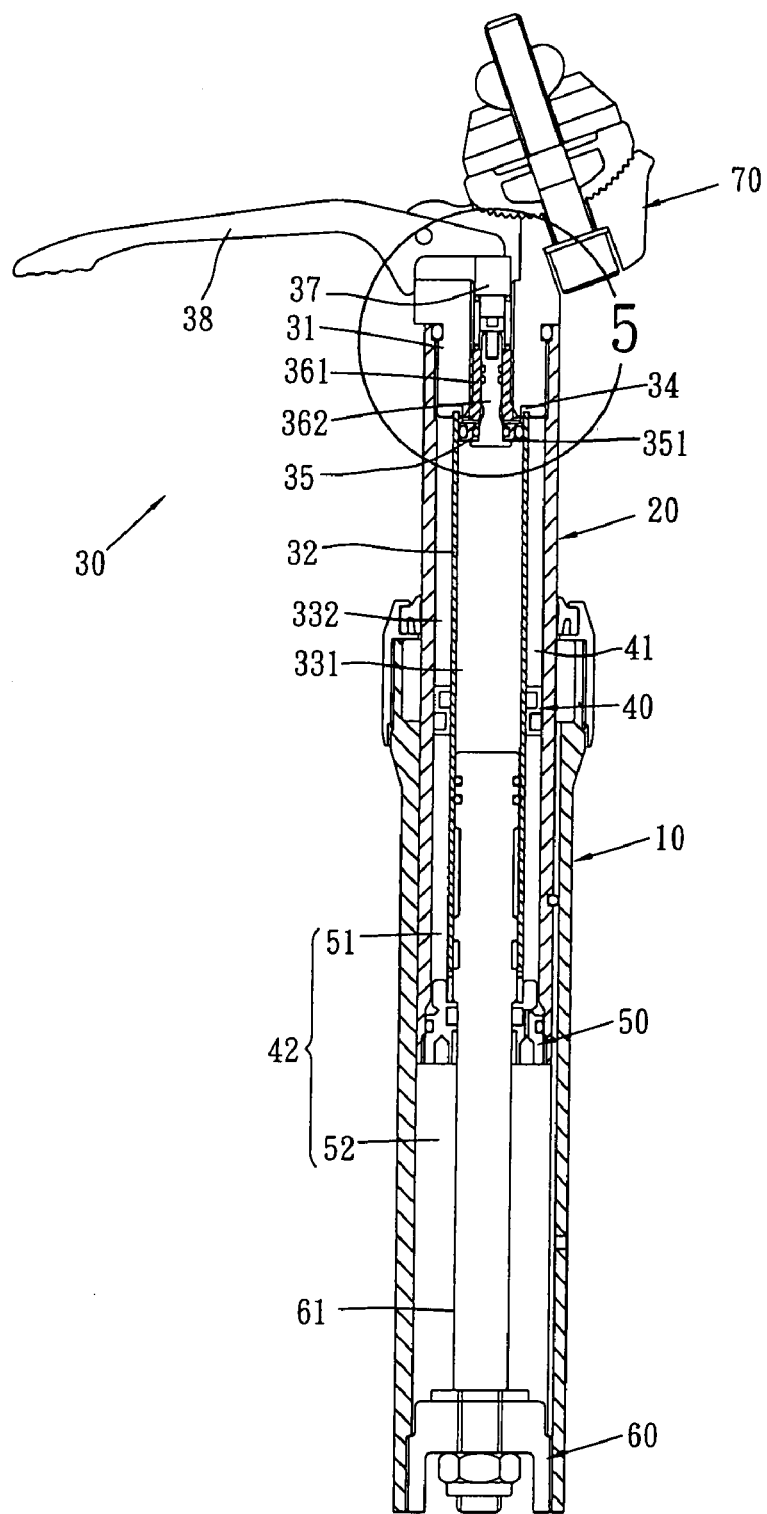
FIG. 2 is a cross sectional view to show the adjustable bicycle seat assembly of the present invention.
Figure 3:
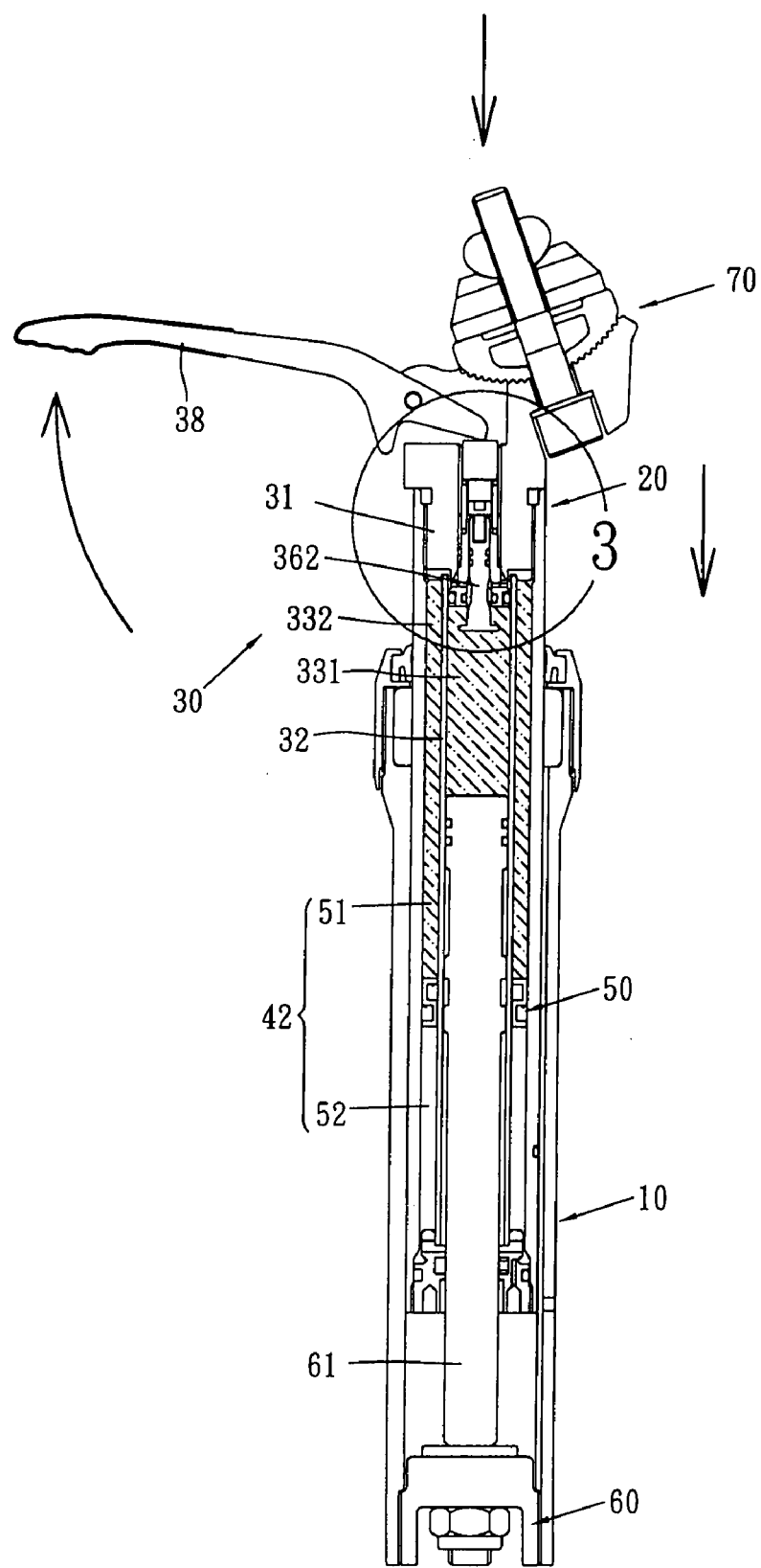
FIG. 3 is a cross sectional view to show the adjustable bicycle seat assembly of the present invention, wherein the lever is pivoted upward and the axle is lowered to open the opening of the first valve.
Figure 4:
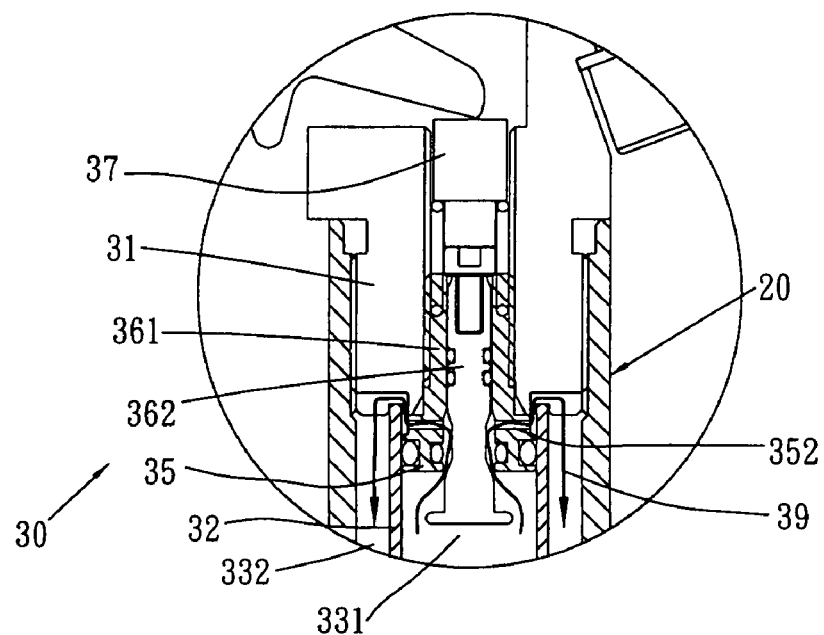
FIG. 4 is an enlarged cross sectional view to show that the axle is lowered to open the opening of the first valve.

As shown in FIGS. 2 to 4, the oil room 41 is filled with hydraulic oil and the air room 42 is filled with pressurized air. When the path 39 is in opened status, the seat post 20 is lowered due to the weight of the rider sitting on the seat 90 and the air in the air room 42 is compressed. When the rider dismounts the bicycle, the seat post 20 moves upward by the pressure of the air.

Figure 5:
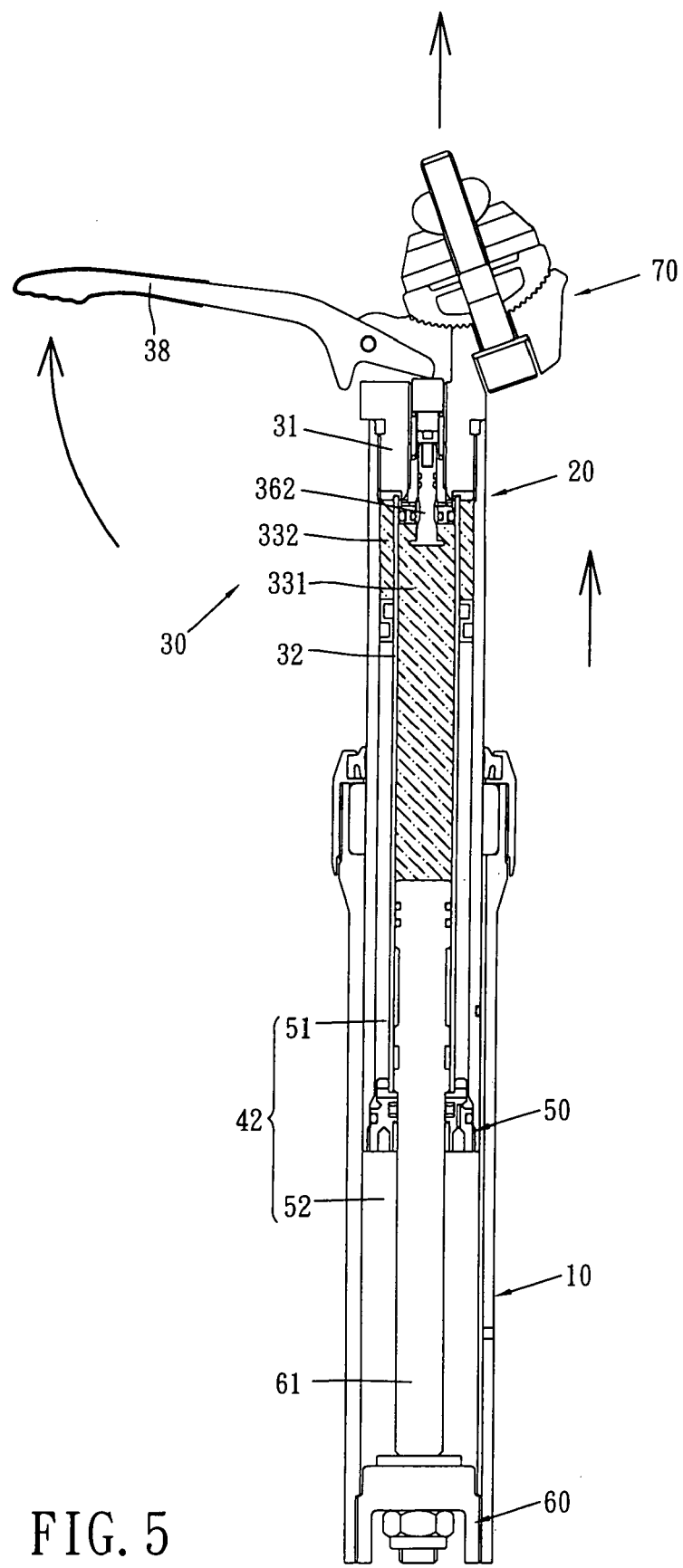
FIG. 5 shows that the lever is pivoted upward and the seat post moves upward.

When adjusting the height of the seat 90, the lever 38 is pivoted upward and the contact member 37 applies a downward force to the axle 362 which is lowered and the lower end of the axle 362 leaves from the lower end of the passage 351 so that the path 39 is opened. After the seat 90 is moved to a desired position, the lever 38 is released as shown in FIGS. 1 and 5, the lower end of the axle 362 seals the lower end of the passage 351 again and the seat post 20 is positioned relative to the seat tube 10.

Figure 6:
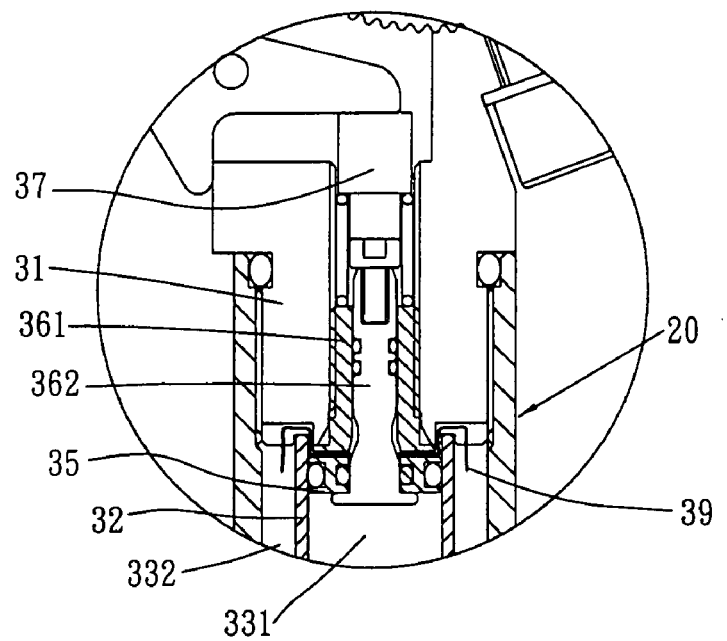
FIG. 6 is an enlarged cross sectional view to show that the axle moves upward to seal the opening of the first valve.
Figure 7:
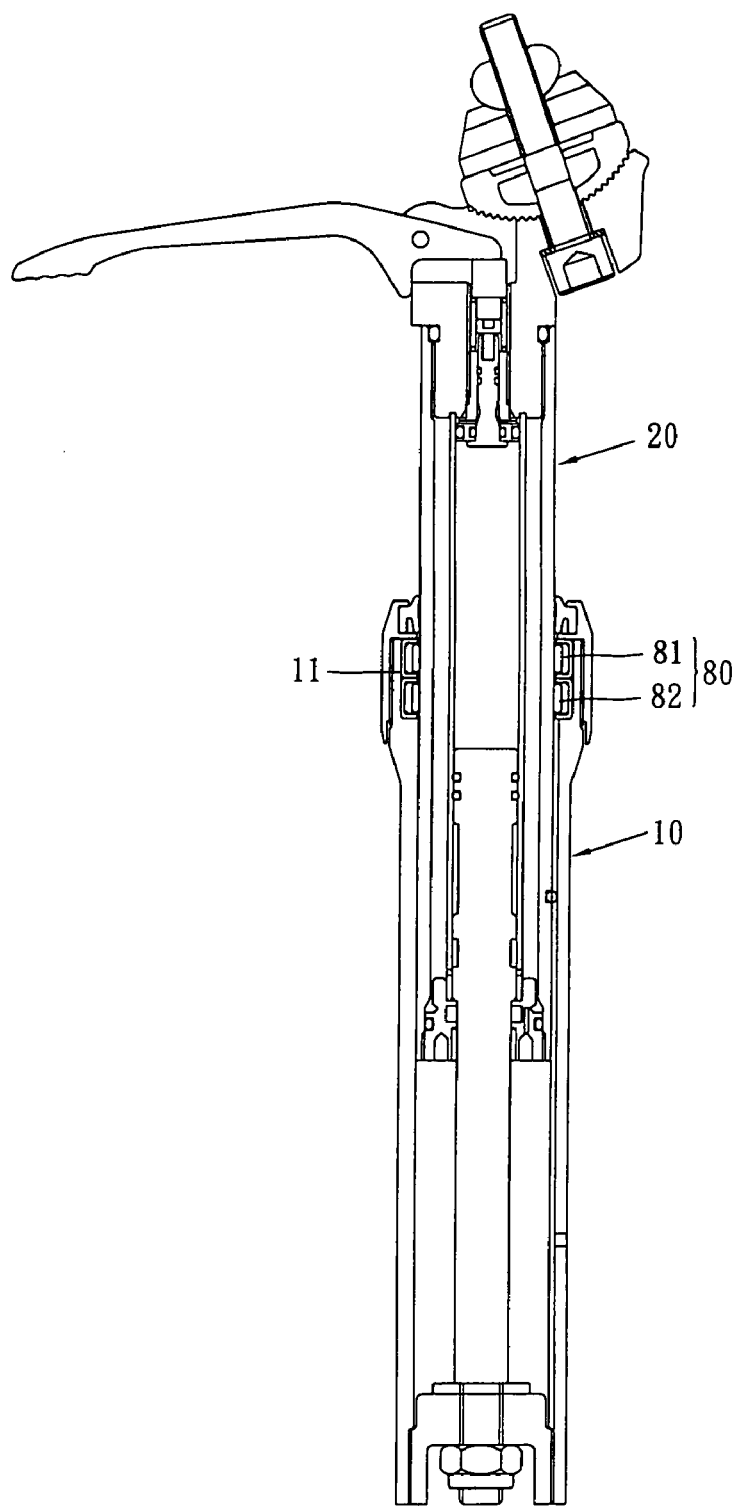
FIG. 7 shows an anti-rotation device is connected between the seat post and the seat tube.

As shown in FIGS. 6 and 7, a recess 11 is defined in an end of the seat tube 10 and an anti-rotation device 80 is received in the recess 11. The anti-rotation device 80 is mounted to the seat post 20 and located between the seat post 20 and the seat tube 10. The anti-rotation device 80 includes at least one first one-direction member 81 and at least one a second one-direction member 82 which rotates in opposite direction to the at least one first one-direction member 81. The at least one first one-direction member 81 is overlapped on the at least one second one-direction member 82. The respective outer peripheries of the at least one first one-direction member 81 and the at least one second one-direction member 82 are engaged with an inner periphery of the seat tube 10. The at least one first one-direction member 81 and the at least one second one-direction member 82 both are one-direction bearings and the at least one first one-direction bearing rotates in the opposite direction to the direction of the at least one second one-direction bearing. The at least one first one-direction member 81 and the at least one second one-direction member 82 shares a common axis so that the seat post 20 cannot rotate relative to the seat tube 10.

Figure 8:
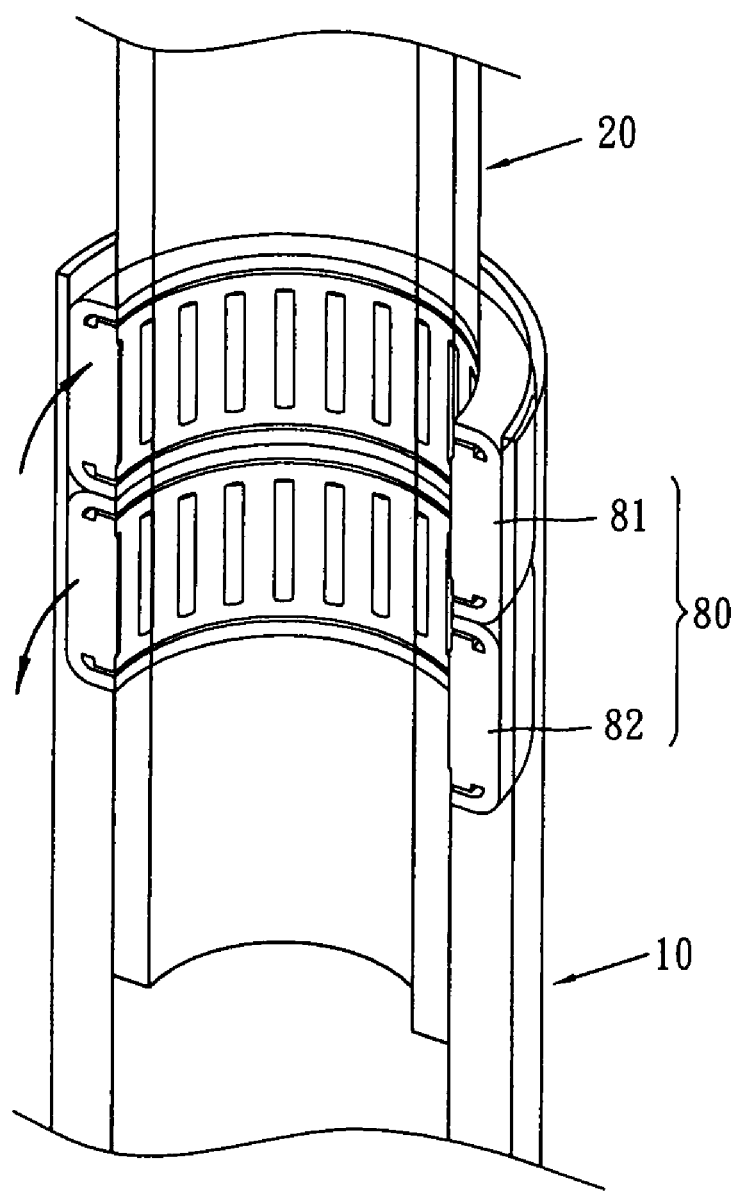
FIG. 8 shows that the anti-rotation device includes two one-direction bearings.

FIG. 8 shows another embodiment of the anti-rotation device 80 wherein the anti-rotation device 80 is a collar-shaped member and the at least one first one-direction member 81 and the at least one second one-direction member 82 are located in an inner periphery of the collar-shaped member. The at least one first one-direction member 81 and the at least one second one-direction member 82 are rollers which are in contact with an inner periphery of the seat tube 10 and alternatively connected to the inner periphery of the collar-shaped member.

The riders simply operate the lever 38 to easily adjust the height of the seat 90 and after the seat 90 is adjusted to desired position, the lever 38 is released to set the position. The anti-rotation device 80 prevents the seat post 20 from rotating relative to the seat tube 10.

While we have shown and described the embodiment in accordance with the present invention, it should be clear to those skilled in the art that further embodiments may be made without departing from the scope of the present invention.

What is claimed is:

1. An adjustable bicycle seat assembly comprising:
    a seat tube (10);
    a seat post (20) having a first end inserted into the seat tube (10) and a second end of the seat post (20) adapted to be connected with a seat (90), and
    an adjusting unit (30) including a top end member (31) connected to the second end of the seat post (20) and an adjusting tube (32) connected to a lower end of the top end member (31), an inner space (331) defined in the adjusting tube (32) and an outer space (332) defined between the adjusting tube (32) and the seat post (20), a path (39) defined between the adjusting tube (32) and the top end member (31) so as to communicate with the inner space (331) and the outer space (332), an axle (362) movably received in the path (39) and removably sealing the path (39).

2. The assembly as claimed in claim 1, wherein at least one gap (34) is defined in the top end member (31) and communicates between the inner and outer spaces (331, 332).

3. The assembly as claimed in claim 1, wherein the adjusting unit (30) includes a first valve (35) which is located in an inner periphery of the second end of the seat post (20) and a passage (351) is defined centrally therethrough so as to form a part of the path (39), the axle (362) movably extends through the passage (351) so as to removably seal an opening in a lower end of the passage (351).

4. The assembly as claimed in claim 3, wherein the first valve (35) is integrally connected with a sleeve (361) and a through hole (352) is defined through a conjunction portion of the first valve (35) and the sleeve (361), the through hole (352) forms a part of the path (39).

5. The assembly as claimed in claim 1, wherein a clamp device (70) is connected to the top end member (31) and adapted to be connected with the seat (80).

6. The assembly as claimed in claim 1, wherein the adjusting unit (30) includes a sleeve (361) which is located in the top end member (31) and the axle (362) movably extends through the sleeve (361), a first valve (35) is located in an inner periphery of the seat post (20) and a gap is defined between a top of the first valve (35) and a lower end of the sleeve (361), the gap forms a part of the path (39).

7. The assembly as claimed in claim 1, wherein a separation member (40) is located between the adjusting tube (32) and the seat post (20) so as to define an oil room (41) and an air room (42).

8. The assembly as claimed in claim 1, wherein a second valve (50) is located in the first end of the seat post (20) and the adjusting tube (32) is connected with the second valve (50), the second valve (50) defines a first chamber (51) in the seat post (20) and a second chamber (52) in the seat tube (10).

9. The assembly as claimed in claim 1, wherein a guide rod (61) has one end inserted into the adjusting tube (32) and a seal member (60) is connected to the other end of the guide rod (61), the adjusting tube (32) moves relative to the seat post (10) along the guide rod (61).

10. The assembly as claimed in claim 1, wherein the adjusting unit (30) includes a lever (38) which is pivotably connected to the second end of the seat post (20) and, the lever (38) extends into the path (39) and is in contact with the axle (362) so as to apply a downward force to move the axle (362).

11. The assembly as claimed in claim 10, wherein a contact member (37) is connected between the lever (38) and the axle (362), the contact member (37) is movable with the lever (38).

\* \* \* \* \*